United States Patent
Wang

(10) Patent No.: US 6,275,947 B1
(45) Date of Patent: Aug. 14, 2001

(54) CONTROL CIRCUIT AND METHOD TO WAKE UP OR TURN ON COMPUTER VIA PERIPHERAL DEVICE

(75) Inventor: Cheng-Chih Wang, Chupei (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/286,141

(22) Filed: Apr. 5, 1999

(30) Foreign Application Priority Data

Feb. 12, 1999 (TW) .................................................. 88102258

(51) Int. Cl.[7] ....................................................... G06F 1/26
(52) U.S. Cl. .......................... 713/300; 713/320; 713/340
(58) Field of Search ................................... 713/300, 320, 713/340

(56) References Cited

U.S. PATENT DOCUMENTS

| | | | |
|---|---|---|---|
| 5,788,196 | * 8/1998 | Flannery | 713/320 |
| 5,812,858 | * 9/1998 | Nookala et al. | 710/260 |
| 5,845,132 | * 12/1998 | Walsh et al. | 710/260 |
| 5,881,300 | * 3/1999 | Chen | 713/340 |

* cited by examiner

*Primary Examiner*—Xuan M. Thai
(74) *Attorney, Agent, or Firm*—Jiawei Huang; J.C Patents

(57) ABSTRACT

A controller circuit and a method to wake up or turn on a computer system by a peripheral device comprising a MIDI port. When the computer system is in a standby or an off state, a certain value or combination of the peripheral device is preset as a default value. Inputting a certain signal to the peripheral device, the wake up/turn on function can be achieved.

14 Claims, 2 Drawing Sheets

CONTROL CIRCUIT AND METHOD TO WAKE UP OR TURN ON COMPUTER VIA PERIPHERAL DEVICE

CROSS-REFERENCE TO RELATED APPLICATION

This application claims the priority benefit of Taiwan application serial no. 88102258, filed Feb. 12, 1999, the full disclosure of which is incorporated herein by reference.

BACKGROUND OF THE INVENTION

1. Field of the Invention

The invention relates to a control circuit to wake up or turn on a computer via a peripheral device. More particularly, the invention relates to a control circuit and a method to wake up or turn on a computer while it is in a standby or off state without using panel switch.

2. Description of the Related Art

A pure mechanical touch-type panel switch is used to turn on/off a power supply in a conventional personal computer (PC) or a workstation with a microprocessor as a kernel. The power supply includes an alternating current (ac) source such as a domestic electricity supply. When the power source is open, there is no power supplied to the power supply of the system, so that the system is in an off state. On the contrary, when the power source is switched to a close state, an ac current is supplied to the power supply of the system. The power supply can thus supply various direct (dc), typically positive/negative (+/−) 5V and positive/negative (+/−) 12V to turn on the computer system. This mechanical type power switch has to be switched manually to turn on/off the computer. Without an operator, the system can not be turned on or off.

A series of Macintosh personal computers developed by Apple Computer Inc., Cupertino, Calif. uses a power-on key on the keyboard to turn on/off the computer system. This is a very handy way for turning on/off the computer system.

The Intel Corporation, Santa Clara, Calif. also proposed an ATX specification of a personal computer. In the ATX specification, a mechanical on/off switch is not used any more as the power supply to directly control system. Instead, the ATX specification uses a circuit in an internal control chip to manage and control the power supply of the computer system. That is, a software control concept is implanted. Various types of switching on/off methods can be applied to control a computer system without being restricted by a mechanically switch which can only set and control the computer in an on or an off state.

For example, the version 2.01 of the ATX specification comprises a spare power source 5VSB which supplies a dc voltage of 5V and a maximum current of 0.7 A. The spare power source 5VSB can thus drive a basic power source control circuit of the computer system under the off state. Functions to advantage the operation can be achieved by setting the control circuit. For example, the system can be preset to be turned on automatically at night. Therefore, an international facsimile can be sent during a period of time which has a cheaper calling rate without the presence of an operator. Moreover, while no operator is available or present, the system can be turned on by an incoming event such as a signal received by a modem. The system can thus receive the incoming message or document automatically.

However, the above power source on/off control is restricted to only turn on/off the system. To control the computer system while it is still in an on state is not disclosed. The Intel, Microsoft, and Toshiba later disclose an advanced configuration and power interface (ACPI) interface to specify four standby states for a computer system during a working and off state. The state of the computer is determined according the working load of the computer to save energy. According to the saved energy, the state of the computer may comprise S1 to S4 states. In the S1 state, the central processing unit (CPU) clock is stopped. The S2 state is a "suspend to RAM" state, the S3 state is a "suspend to disk state", and the S4 state is a soft off state. When the system is in the "suspended to RAM" state, apart from the real-time clock, the other clock pulse has been stopped. The CPU and other circuits are stopped without being supplied by any clock pulse. If a user want to wake up the system, he/she has to press a panel switch to notice the computer back to an operation state. Meanwhile, the keyboard controller and the infrared controller (or the serial port) can not function to wake up the system since they both have stopped working.

FIG. 1 shows diagram illustrating the connection relationship between a peripheral device 11 and a peripheral device controller 12 of a computer system. When the state of the computer system is in the "suspended to RAM" state, the peripheral device controller 12 has stopped functioning. Therefore, the task to wake up the system can not be done by the peripheral device 11. If a user wants to wake up the system, he/she has to press a panel switch to generate and send a signal PENAL_SW_IN to chipset 13 on a mother board 10. Thus, when the system is in a standby state, the computer can only be woken up through the panel switch. While the system is in an off state, it is impossible to be turned up via the peripheral device 11.

Thus, according to the conventional method, no matter if the computer is in a standby or an off state, only the current existent switching method, for example, by a panel switch, a keyboard, a mouse, an alarm, a modem, or a network, can achieve the wake-up or turn-on task. The task can not be achieved by way of a peripheral device.

SUMMARY OF THE INVENTION

The invention provides a control circuit comprising a MIDI port of a peripheral device to turn on or wake up a computer. The control circuit is coupled between the peripheral device and a main bus. The control circuit further comprises a MIDI receiver, a register, a comparator, and a power supply controller. The MIDI receiver is coupled to the peripheral device to receive a MIDI_IN signal of the peripheral device. The register is used to store data information with a default value. By the comparator, the MIDI_IN signal is compared to the data information of the register, so that an enable signal is output when the default value is equal to a value of the MIDI_IN signal. Whereas, the power supply controller is coupled to the comparator to wake up or turn on the computer system according to the enabling signal sent from the comparator.

Therefore, no matter if the computer system is in a standby state or an off state, the computer system may be woken up or turned on back to a normal operating state. In addition to the conventional method to wake up or turned on the computer system via a panel switch, an accessory, or other mechanical way, the computer system may also be woken up or turned on by a peripheral device.

The invention further provides a method to turn on or wake up a computer via a peripheral device comprising a MIDI port. The computer system comprises at least a control circuit, a chipset, and an ATX power supply. The control circuit further comprises a MIDI receiver, a comparator, a register, and a power supply controller. Before the computer system enters an off or a standby state, a default value is preset and stored to the register. After the computer enters the off or standby state, a MIDI_IN signal from the peripheral device to the MIDI receiver after the computer enters the off or the standby state. A value of the MIDI_IN signal is compared to the default value from the register by the comparator. An enable signal is input to the power supply controller from the comparator when the value of the MIDI_IN signal is equal to the default value. The computer system is woken up or turned on via the ATX power supply and the chipset controlled by the power supply controller according to the enable signal.

More specifically, when the computer system is in a standby state, according to the enable signal, a PANEL_SW_OUT signal is sent to the chipset to wake up the computer. While the computer system is in an off state, according to the enable signal, a PS_ON signal and a PANEL_SW_OUT are sent to the ATX power supply and the chipset, respectively. The ATX power supply and the chipset are thus driven to enable the computer system to operate under a normal condition. In addition, the power supply controller may also receive a PANEL_SW_IN signal, and output the PANEL_SW_OUT signal to the chipset to wake up the computer.

It is to be understood that both the foregoing general description and the following detailed description are exemplary and explanatory only and are not restrictive of the invention, as claimed.

DESCRIPTION OF THE PREFERRED EMBODIMENTS

Figure 1:
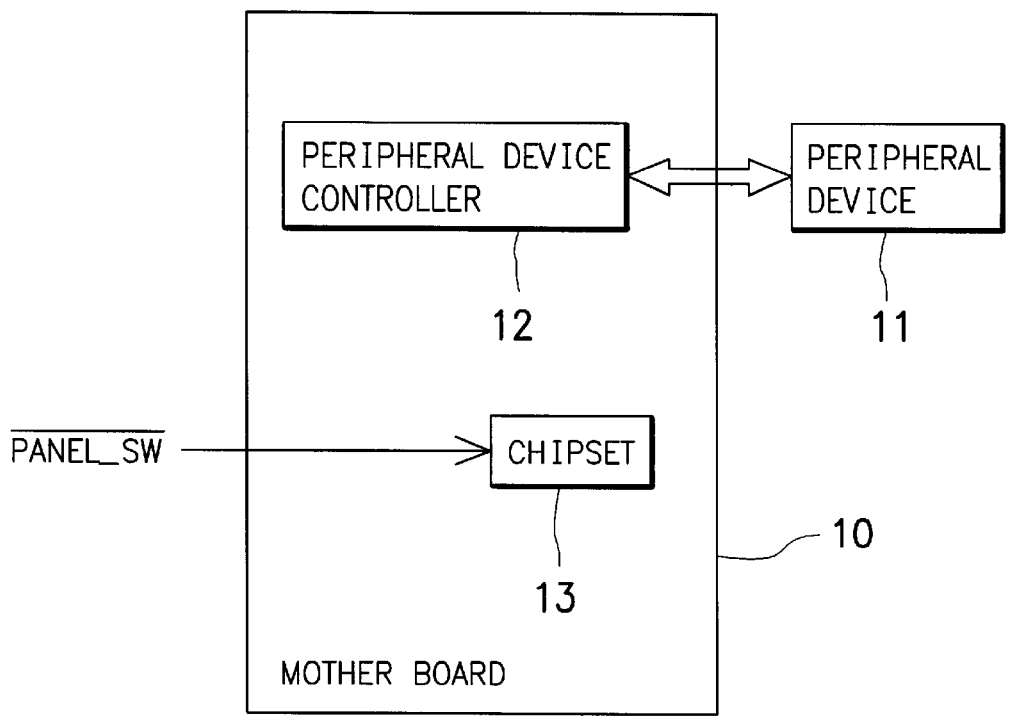
FIG. 1 shows a connection relationship between an peripheral device and a peripheral device controller of a conventional computer system.
Figure 2:
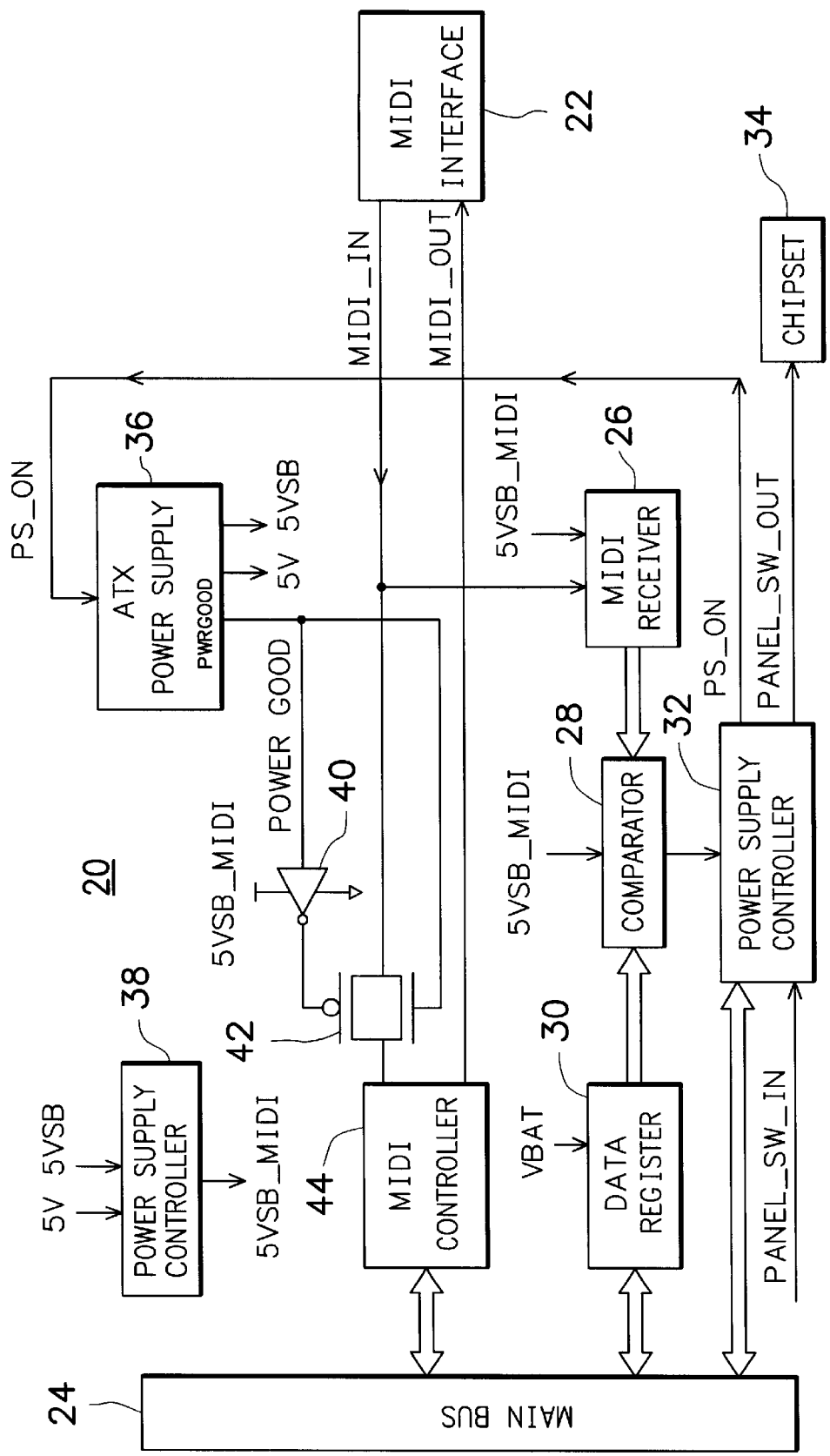
FIG. 2 is a drawing of a control circuit for turning on or waking up a computer via a peripheral device comprising a MIDI port.

The invention provides a method to turn on or wake up a computer system via a peripheral device. Therefore, in addition to a computer accessory such as a panel switch, a mouse, a keyboard, another method using a control circuit to wake up or turning on the computer is provided. As shown in FIG. 2, a drawing of a control circuit to turn on/wake up a computer via a peripheral device comprising a MIDI port is shown.

The control circuit 20 may be formed in a typical computer system and coupled between a host bus 24 and a MIDI interface of an peripheral device such as a piano, a mellotron, a keyboard, or other music instruments. The control circuit 20 comprises a MIDI receiver 26, a non-volatile memory or data register 30, and a power supply controller 32. In this embodiment, a data register 30 is used. The MIDI receiver 26 is used to receive a MIDI_IN signal from the MIDI interface 22. The MIDI_IN signal is delivered to a comparator 28 to perform a data comparison. That is, the MIDI_IN signal is compared with data information sent from the data register 30 to determine whether the default value of the data information is the same as the value of the MIDI_IN signal. If both of them are identical, an enable signal is sent from the comparator 28 to the power supply controller 32. The power supply controller 32 may then receive an output signal PANEL_SW_IN from the panel switch, so as to output a PANEL_SW_OUT signal to the chipset 34. Thus, the chipset 34 may wake up or turn on the computer system. When the computer system is in a standby state, while the power supply controller 32 receives the enable signal from the comparator 28, the power supply controller 34 outputs the PANEL_SW_OUT signal to the chipset 34, by which the computer system is woken up from a standby state. When the computer system is in an off state, the power supply controller 32 outputs a PS_ON signal to an ATX power supply 36 and the PANEL_SW_OUT signal to the chipset 34. By both of the ATX power supply 36 and the chipset 34, the computer system is operated normally.

The operation method is described as follows. The latest version 2.01 of the ATX specification is used as an example herewith. As it is known to those skilled in the art, the spare power supply 5VSB thereof is a dc 5V power source with a maximum current supply of 0.7 A, so that the basic power source control circuit of the computer system is driven under an off state. Thus, under the off state, the ATX power supply 36 still comprises a spare power source 5VSB to drive the basic power source control circuit of the computer system. The invention utilizes the spare power source 5VBS to achieve the turn on/wake up job for the computer system. That is, no matter whether the computer is in an off state, the ATX power supply 36 may output a 5V voltage or the spare power source 5VSB to the power supply 38. Therefore, a 5VBS_MIDI voltage is maintained at the power supply 38 to drive the MIDI receiver 26, the comparator 28, and an inverter 40 coupled to a PWRGOOD pin of the ATX power supply 36.

For example, the user may set a control mode to wake up or turn on the system via an interface 22 of a peripheral device. The setting is stored into the register 30 before the computer enters a standby or off state. For example, the user may set an input value of the MIDI interface 22 as a certain value or combination. Or alternatively, the user may also set methods such as pressing certain keys of the keyboards as a command to wake up or turn on the system.

When the computer is working normally, the output level of the PWRGOOD is high to turn on a transmitting gate 42, so as to deliver a signal between the external MIDI interface 22 and the MIDI controller 44. The inverter 40 and the transmitting gate 42 are equivalent to a switch circuit to determine the on/off state between the MIDI interface 22 and the MIDI controller 44 according to a POWERGOOD signal output by the PWRGOOD pin. Basically, when the ATX power supply 36 is in a power on state, the level of the output POWERGOOD signal is high. One the contrary, when the ATX power supply 36 is in a power off state, the level of the output POWERGOOD signal is low.

When one wants to wake up the computer system via a peripheral device when the computer system is in a standby state, the user has to input a certain MIDI_IN signal. After receiving this MIDI_IN signal, the MIDI receiver 26 sends this MIDI_IN signal to the comparator 28. Again, the MIDI_IN signal is compared to a data information coming from the register 30. If the value of the MIDI_IN signal is equal to the default value of the data information of the register 30, the comparator 28 outputs an enable signal to the power supply controller 32 to drive and operate the power supply controller 32. Hereafter, the power supply controller 32 outputs an output signal PANEL_SW_OUT to the chipset 34, by which the computer system in the standby state is woken up to a normal working state.

While the computer system is in an off state, similarly, a certain MIDI_IN signal is required and input by an external MIDI interface 22. After receiving the MIDI_IN signal, the MIDI_IN receiver 26 transmits this MIDI_IN signal to the comparator 28. The MIDI_IN signal is compared to a data information from the register 30. When the value of the MIDI_IN signal is the same as the default value of the data information of the register 30, an enable signal is generated by the comparator and input to the power supply controller 32, so as to drive the power supply controller 32 to operate. The power supply controller 32 then outputs a PS_ON signal to the ATX power supply 36 and to drive the ATX power supply 36. Meanwhile, a PANEL_SW_OUT signal is sent to the chipset 34, the chipset 34 is thus driven to enable the computer system to work.

As mentioned above, no matter if the computer is in a standby or an off state, the invention can not only wake up or turn on the computer system back to a normal working state, but can also wake up or turn on the computer system via a peripheral device. However, the user may wake up or turn on the computer only by presetting an input signal of the peripheral device as a certain value or a combination.

The operation steps of the control circuit of the invention can thus be briefly described as:

Step 1: storing a default value to wake up or turn on a computer system before the computer system entering a standby or off state.

Step 2: input a signal with a certain value of a peripheral device to the control circuit after the computer system entering the standby or off state.

Step 3: comparing the certain value with the default value.

Step 4: waking up or turning on the computer system back to normal working state when the certain value is equal to the default value.

The invention can thus not only use a panel switch to wake up or turn on the computer system, but can also wake up or turn on the computer system via a peripheral device. A very intelligent design of the computer system is thus developed.

Other embodiment of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A control circuit comprising a MIDI port of a peripheral device to turn on or wake up a computer system, wherein the control circuit is coupled between the peripheral device and a main bus, the control circuit comprising:
   a MIDI receiver, coupled to the peripheral device to receive a MIDI_IN signal of the peripheral device;
   a register, to store a data information with a default value;
   a comparator, to compare the MIDI_IN signal with the date information sent from the register and to output an enable signal when the default value is equal to a value of the MIDI_IN signal; and
   a power supply controller, coupled to the comparator and to wake up or turn on the computer system according to the enable signal sent from the comparator.

2. The control circuit according to claim 1, wherein register comprises a non-volatile memory.

3. The control circuit according to claim 1, wherein the power supply controller is further coupled to a chipset of the computer system, and
   while the computer system is in a standby, the power supply controller outputs a PANEL_SW_OUT signal to the chipset to wake up the computer according to the enable signal; and
   while the computer system is in an off state, the power supply controller outputs a PS_ON signal to an ATX power supply of the computer system, and a PANEL_SW_OUT signal to the chipset to drive the ATX power supply and the chipset, so that the computer system is turned on to function normally.

4. The control circuit according to claim 3, wherein while the computer system is in an off state, the power supply controller may receive a PANEL_SW_IN signal sent from a panel switch and output the PANEL_WE_OUT signal to the chip set to turn on the computer system.

5. The control circuit according to claim 3, further comprising:
   a switch circuit, coupled to the peripheral device and the ATX power supply to receive a power state signal of the ATX power supply, and to determine whether the switch circuit is a close or open circuit according to the power state signal; and
   a MIDI controller, coupled to the switch circuit, to transmit a signal to the peripheral device via the switch circuit.

6. The control circuit according to claim 5, wherein the control circuit further comprises a power supply control circuit, coupled to the ATX power supply to output a 5VSB_MIDI voltage to drive the switch circuit, the MIDI receiver and the comparator.

7. The control circuit according to claim 5, wherein the switch circuit comprises an inverter and a transmitting gate.

8. The control circuit according to claim 1, wherein the peripheral circuit comprises a piano, a mellotron, or a keyboard.

9. A method to turn on or wake up a computer system via a peripheral device comprising a MIDI port, wherein the computer system comprises at least a chipset, an ATX power supply, and a control circuit, the method comprising:
   presetting a default value to the control circuit before the computer system enters an off or a standby state;
   inputting a certain signal from the peripheral device to the control circuit after the computer enters the off or the standby state;
   comparing a value of the certain signal to the default value; and
   turning on or waking up the computer system via the ATX power supply and the chipset, so as to enable the computer system to operate normally.

10. The mother board according to claim 9, wherein the control circuit comprises a MIDI receiver, a comparator, a register and a power supply controller.

11. A method to turn on or wake up a computer system via a peripheral device comprising a MIDI port, wherein the computer system comprises at least a chipset, an ATX power supply, and a control circuit which further comprises a MIDI receiver, a comparator, a register, and a power supply controller, the method comprising:
   presetting a default value to the register before the computer system enters an off or a standby state;
   inputting a MIDI_IN signal from the peripheral device to the MIDI receiver after the computer enters the off or the standby state;
   comparing a value of the MIDI_IN signal to the default value from the register by the comparator;
   inputting an enable signal to the power supply controller from the comparator when the value of the MIDI_IN signal is equal to the default value; and turning on or waking up the computer system via the ATX power supply and the chipset controlled by the power supply controller according to the enable signal.

12. The method according to claim 11, when the computer system enters a standby state, the power supply controller outputs a PENAL_SW_ON signal to the chipset to wake up the computer.

13. The method according to claim 11, when the computer system enters an off state, the power supply controller outputs a PS_ON signal to the ATX power supply and a PANEL_SW_OUT signal respectively, so as to the chipset to drive the ATX power supply and the chipset to turn on the computer system.

14. The method according to claim 11, wherein the power supply controller may also receive a PANEL_SW_IN signal from a panel switch to output a PENAL_SE_OUT to the chipset to turn on or wake up the computer.

* * * * *